US011157565B2

(12) United States Patent
Jung et al.

(10) Patent No.: US 11,157,565 B2
(45) Date of Patent: Oct. 26, 2021

(54) PARALLEL PARTITION-WISE INSERT SUB-SELECT

(71) Applicant: SAP SE, Walldorf (DE)

(72) Inventors: SungGun Jung, Anyang (KR); Yuchon Yi, Yongin (KR); Holger Bischoff, Dielheim (DE)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 16/374,898

(22) Filed: Apr. 4, 2019

(65) Prior Publication Data

US 2020/0320137 A1    Oct. 8, 2020

(51) Int. Cl.
*G06F 16/903* (2019.01)
*G06F 16/9032* (2019.01)

(52) U.S. Cl.
CPC .... *G06F 16/90335* (2019.01); *G06F 16/9032* (2019.01)

(58) Field of Classification Search
CPC ........... G06F 16/90335; G06F 16/9032; G06F 16/242; G06F 16/2471; G06F 16/24532; G06F 16/245; G06F 16/24534; G06F 16/2453; G06F 16/24542
See application file for complete search history.

(56) References Cited

U.S. PATENT DOCUMENTS

| 5,742,806 A | * | 4/1998 | Reiner | G06F 16/24532 |
| 2010/0030793 A1 | * | 2/2010 | Cooper | G06F 16/2282 |
| | | | | 707/602 |
| 2015/0149413 A1 | * | 5/2015 | Lee | G06F 16/23 |
| | | | | 707/643 |

* cited by examiner

*Primary Examiner* — Tamara T Kyle
*Assistant Examiner* — Lana Alagic
(74) *Attorney, Agent, or Firm* — Buckley, Maschoff & Talwalkar LLC (57) ABSTRACT

A system includes reception of a database query, the query comprising a first query statement to insert rows of a source table into a target table, generation a second query statement and a third query statement based on the first query statement, the second query statement to insert rows of a first partition of the source table into the target table and the third query statement to insert rows of a second partition of the source table into the target table, generation of a first query operator executable to perform the second query statement, generation of a second query operator executable to perform the third query statement, transmission of the first executable query operator to a second database server node storing the first partition of the source table, and transmission of the second executable query operator to a third database server node storing the second partition of the source table.

13 Claims, 8 Drawing Sheets

PARALLEL PARTITION-WISE INSERT SUB-SELECT

BACKGROUND

Database systems may provide distributed data storage and distributed query execution. For example, a database system may include one or more database nodes, each of which stores unique data and is capable of executing query operators. A distributed architecture may therefore require the execution of queries on data which spans multiple database nodes.

An INSERT sub-SELECT query statement requests the copying of particular rows of a source table into a target table. In a distributed database, the rows may be located in different partitions of the source table which are stored at different nodes. According to conventional systems, all the source table rows to be copied are collected from their respective nodes at a master node, which then sends updates to the nodes which store appropriate partitions of the target table. This transfer of data among nodes increases transaction latency and resource consumption.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to insertion of particular rows of a partitioned source table into a partitioned target table while minimizing off-node data transfers. For example, selected rows of a source table may be inserted into a target table by instructing a first node to copy rows of a first partition of the source table located on the first node to a first partition of the target table located on the first node, and by instructing a second node to copy rows of a second partition of the source table located on the second node to a second partition of the target table located on the second node. Such features may improve transaction latency and reduce resource consumption.

Figure 1:
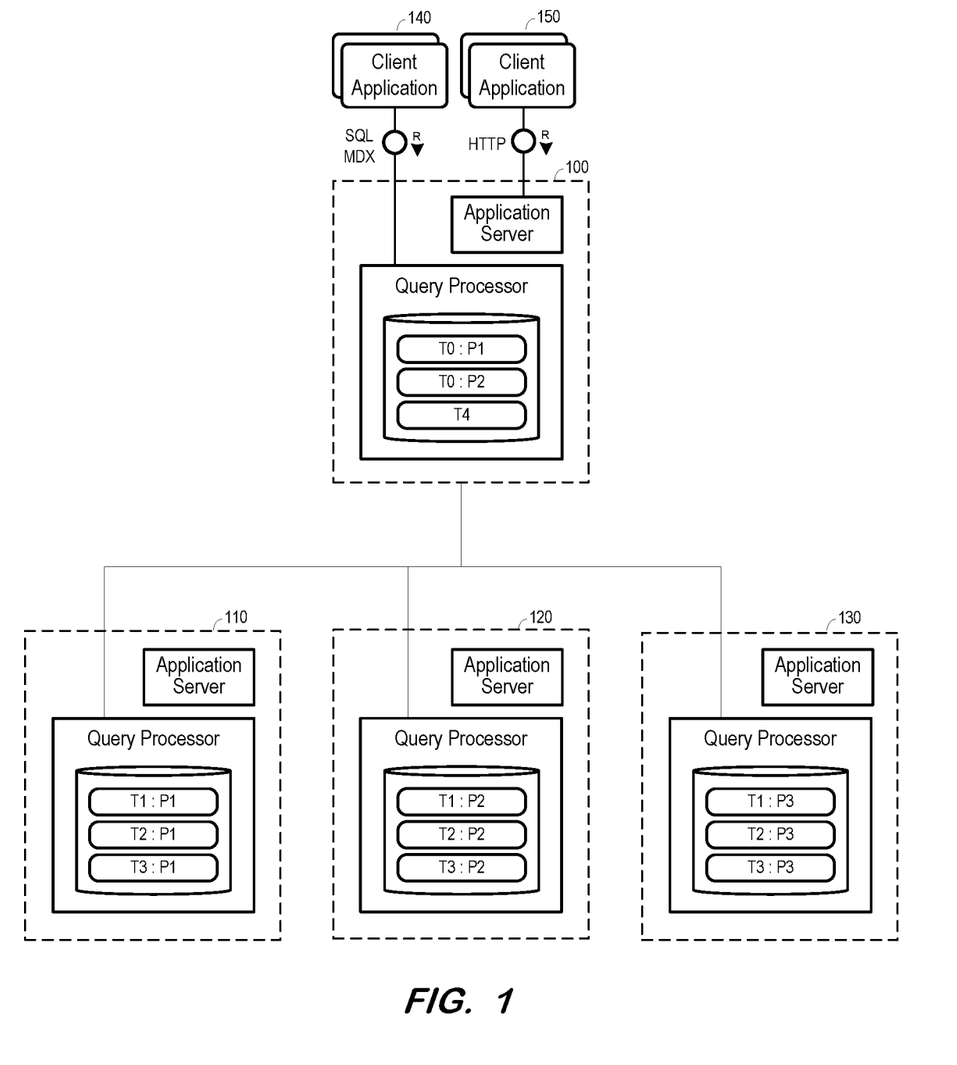
FIG. 1 is a block diagram of a distributed database system including partitioned tables according to some embodiments.

FIG. 1 is a block diagram of a distributed database architecture according to some embodiments. Embodiments are not limited to the FIG. 1 architecture.

FIG. 1 illustrates server nodes 100, 110, 120 and 130. Although FIG. 1 illustrates node 100 receiving requests from client applications 140 and 150, generally, any one of nodes 100, 110, 120 and 130 may receive a query from client applications 140 and 150 and returns results thereto based on data stored within nodes 100, 110, 120 and 130. If the server node receiving the request does not store all of the data needed to fulfill the request, execution of some operations may be delegated to other server nodes as will be described in detail below.

Each of nodes 100, 110, 120 and 130 executes program code to provide an application server and a query processor. The application server provides services for executing server applications. For example, Web applications executing on an application server may receive HyperText Transfer Protocol (HTTP) requests from client applications 150 as shown in FIG. 1.

A query processor contains the actual stored data and engines for processing the data. An execution engine of a query processor may provide one or more physical operators corresponding to one or more logical operators. The physical operators may comprise processor-executable program code which is executable to perform corresponding logical operations (e.g., INSERT, JOIN, SELECT, etc.) on stored data. The set of logical operators for which an execution engine includes one or more physical operators might not be identical across execution engines. Moreover, a physical operator provided by one execution engine and corresponding to a logical operator may differ from a physical operator provided by another execution engine and corresponding to the same logical operator. The data format output by various physical operators of various execution engines (even those corresponding to a same logical operator) may differ as well.

The query processor is responsible for processing Structured Query Language (SQL) and Multi-Dimensional eXpression (MDX) statements and may receive such statements directly from client applications 140. The query processor may also include a statistics server for use in determining query execution plans. A compilation server may also be provided to compile stored procedures and programs.

Each of server nodes 100, 110, 120 and 130 may include many additional software components providing functionality that is or becomes known. For example, server nodes 100, 110, 120 and 130 may include components to perform administrative and management functions. Such functions may include snapshot and backup management, indexing, optimization, garbage collection, and/or any other database functions that are or become known.

In some embodiments, the data of server nodes 100, 110, 120 and 130 may comprise one or more of conventional tabular data, row-based data, column-based data, and object-based data. Moreover, the data may be indexed and/or selectively replicated in an index to allow fast searching and retrieval thereof. Server nodes 100, 110, 120 and 130 may support multi-tenancy to separately support multiple unrelated clients by providing multiple logical database systems which are programmatically isolated from one another.

One or more of server nodes 100, 110, 120 and 130 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of server nodes 100, 110, 120 and 130 includes table partitions. The notation Tt:Pp represents partition p of table Tt. As shown, some tables (e.g., T1, T2, T3) consist of partitions stored on different server nodes. The partitions of table T0 are stored entirely on server node 100, and Table T4 of server node 100 is not partitioned. A table may be hash-partitioned, range-partitioned, or round-robin partitioned. As will be described below, some embodiments may operate in conjunction with source and target tables including partitions of same of different types.

Figure 2:
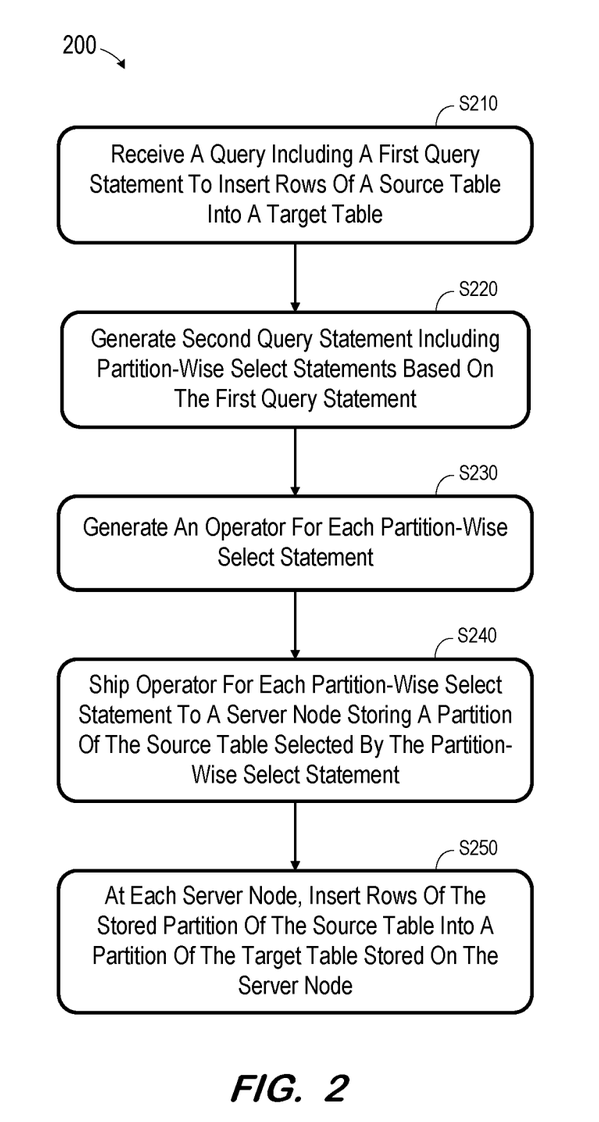
FIG. 2 is a flow diagram to insert rows of a partition of a first table into a partition of a second table according to some embodiments.

FIG. 2 comprises a flow diagram of process 200 according to some embodiments. In some embodiments, various hardware elements of server node 100 execute program code to perform process 200. Process 200 may be executed by a pre-processing layer of a query processor of server node 100.

Process 200 and all other processes mentioned herein may be embodied in computer-executable program code read from one or more non-transitory computer-readable media, such as a hard disk drive, a nonvolatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A query is initially received at S210. The query includes a first query statement which requests insertion of selected rows of a first table into a target table. According to some embodiments, the first query statement is an INSERT sub-SELECT Structured Query Language (SQL) statement. The query received at S210 may consist entirely of the first query statement or may include other query statements. According to the present example, the source table and the target table are partitioned tables.

Figure 3:
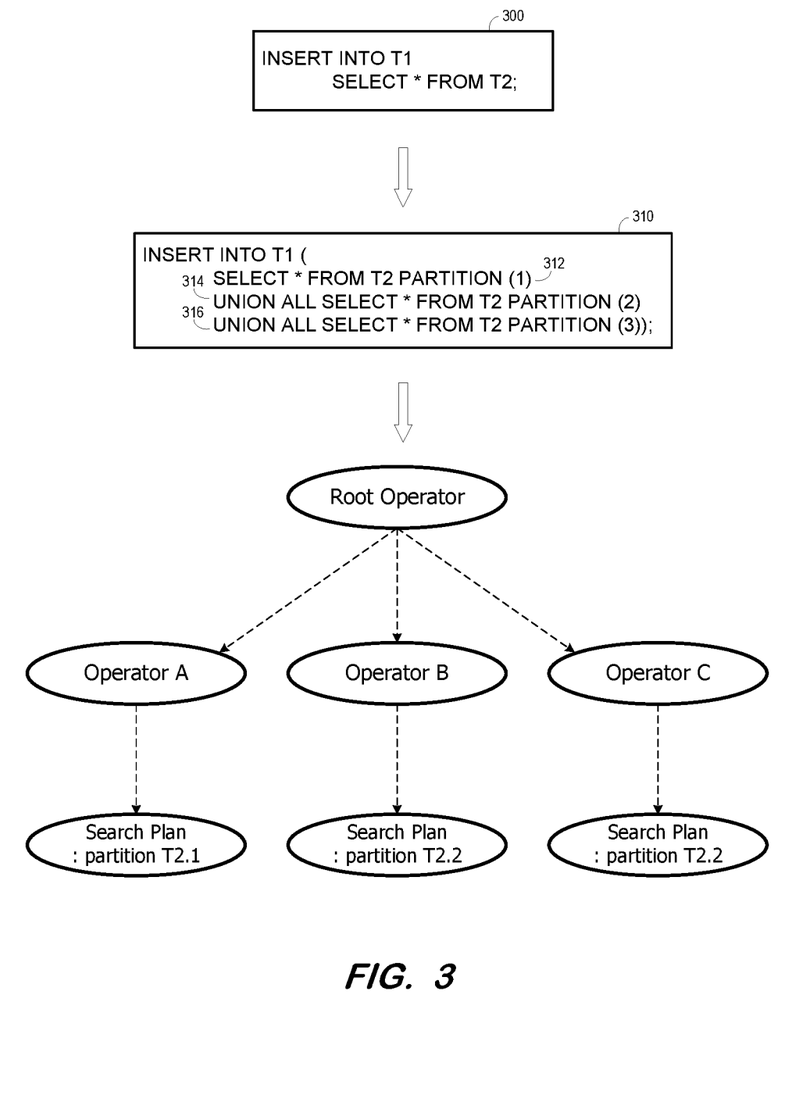
FIG. 3 illustrates query manipulation and query operator splitting according to some embodiments.

Next, a second query statement is generated at S220. The second query statement is generated based on the first statement and includes partition-wise select statements. FIG. 3 illustrates S210 and S220 according to some embodiments. As shown, query 300 including a first query statement is received at S210. The first query statement is a request to insert all rows of table T2 into table T1.

Query statement 310 is generated based on query 300 at S220. Query statement 310 converts the select statement of query 300 into three select statements 312, 314 and 316, each of which selects rows from a respective partition of table T2. Accordingly, S220 requires awareness of the partitions of source table T2.

At S230, an operator is generated for each partition-wise select statement. With respect to the example of FIG. 3, operator A is generated based on select statement 312, operator B is generated based on select statement 314, and operator C is generated based on select statement 316. Operator A may comprise a plan for searching partition 1 of source table T2, operator B may comprise a plan for searching partition 2 of source table T2, and operator C may comprise a plan for searching partition 3 of source table T2.

Figure 4:
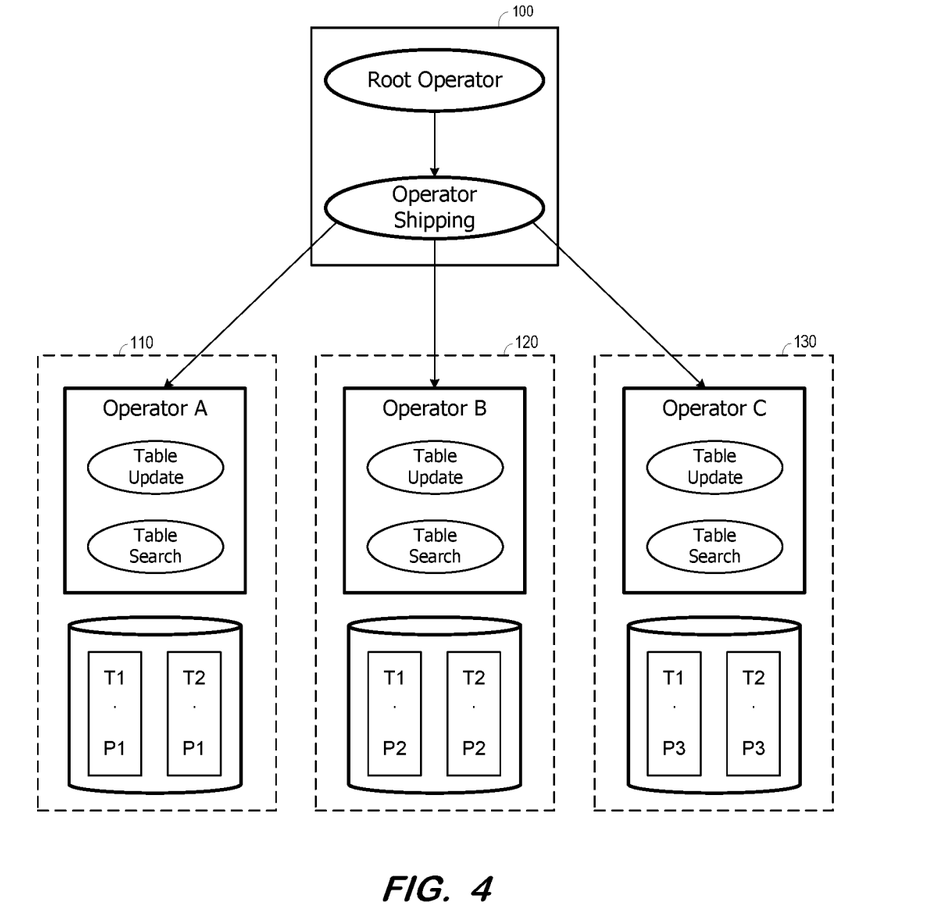
FIG. 4 illustrates shipping of split query operators according to some embodiments.

The operator generated for each partition-wise select statement is shipped to a server node storing a partition of the source table which is selected by the partition-wise select statement at S240. For example, node 110 stores the partition (i.e., partition 1 of source table T2) which is selected by the partition-wise select statement based on which operator A was generated. Accordingly, FIG. 4 illustrates shipment of operator A from server node 100 to node 110. Similarly, operator B is shipped to node 120 including partition 2 of source table T2, and operator C is shipped to node 130 including partition 3 of source table T2.

Figure 5:
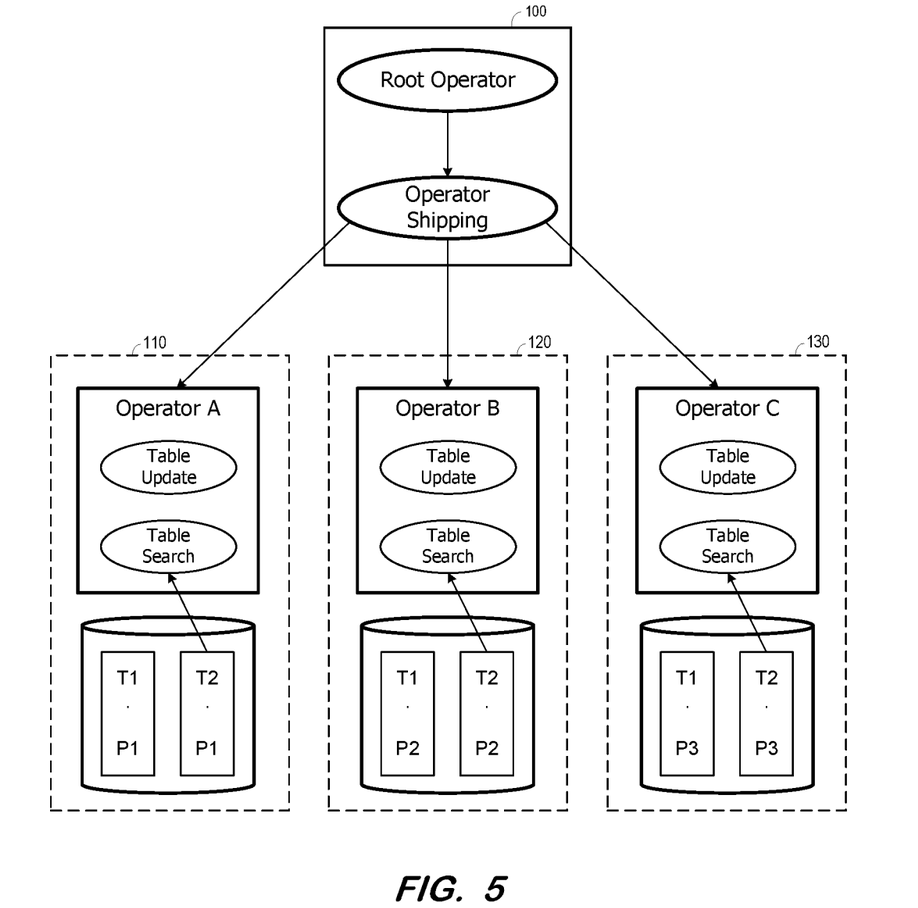
FIG. 5 illustrates table searches of source table partitions according to some embodiments.

At S250, rows of the partition of the source table stored at each server node are inserted into the partition of the target table stored on the same server node. As a result, inter-node shipping of these rows is eliminated. FIG. 5 illustrates execution of the shipped operators at each server node to select on-node rows of a partition of target table T2 as specified by the operators. Next, as shown in FIG. 6, the selected rows are inserted into the appropriate on-node partitions of target table T1.

Figure 6:
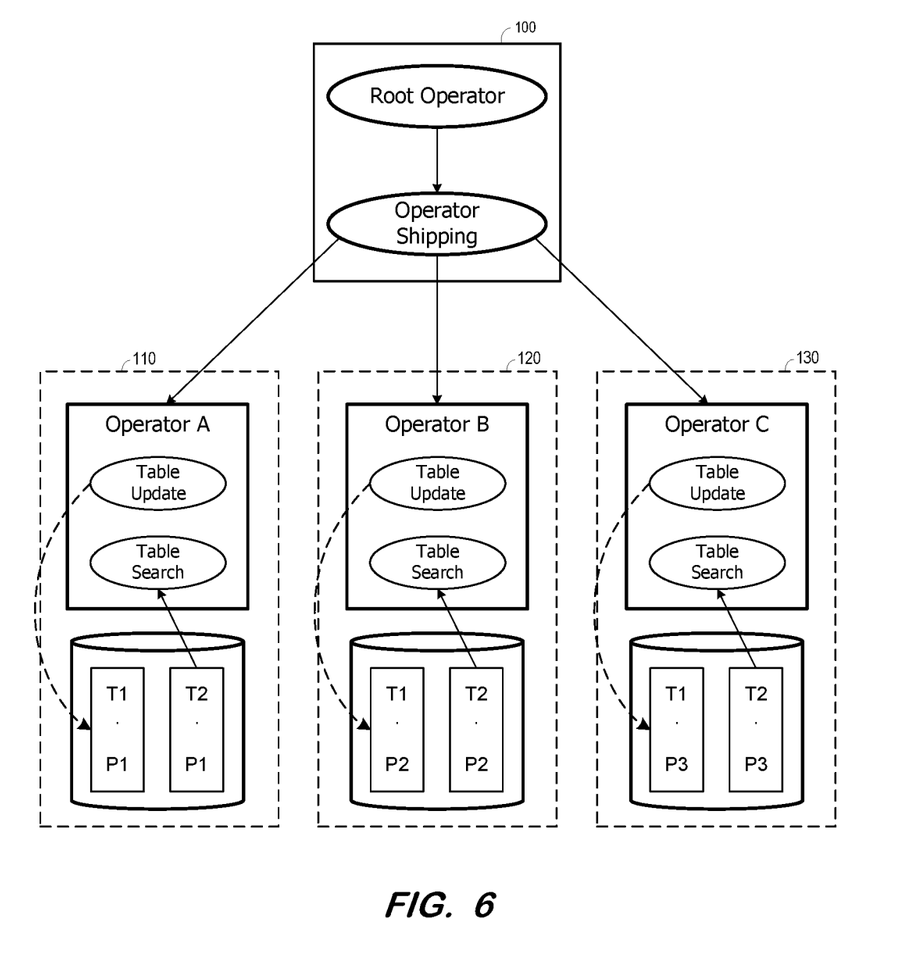
FIG. 6 illustrates on-node internal table insertion of source partition rows into a target partition according to some embodiments.

FIG. 6 illustrates a situation in which the source table and target table share a same partitioning and storage scheme. As a result, the selected rows from one partition of the source table are inserted into a partition of the target table which is stored on a same node. According to some embodiments, the source table and the target table have different partitioning schemes. Consequently, rows which are selected from a single partition of the source table may need to be inserted into two or more partitions of the target table.

Figure 7:
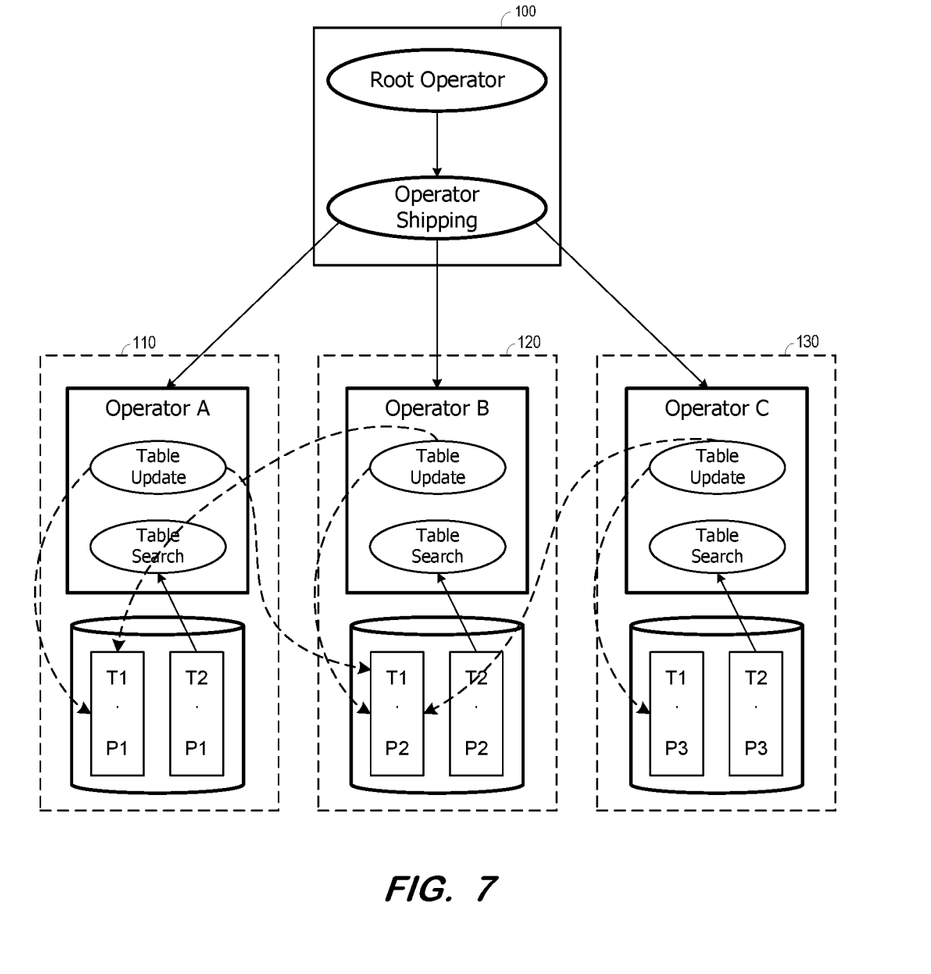
FIG. 7 illustrates on-node and off-node internal table insertion of source partition rows into target partitions according to some embodiments.

FIG. 7 illustrates execution of S250 in the case of different source and target table partitioning schemes. As shown, selected rows of partition 1 of table T2 are inserted into co-located partition 1 of table T1 as described above, but other rows of partition 1 of table T2 are inserted into partition 2 of table T1 located on node 120 in order to conform to the partitioning scheme of table T1. Similarly, selected rows of partition 2 of table T2 are inserted into co-located partition 2 of table T1 and into partition 1 of table T1 located on node 110, and selected rows of partition 3 of table T2 are inserted into co-located partition 3 of table T1 and into partition 2 of table T1 located on node 120. Although the scenario of FIG. 7 includes some inter-node data transfer, benefits are still provided by the on-node updates which do occur.

Figure 8:
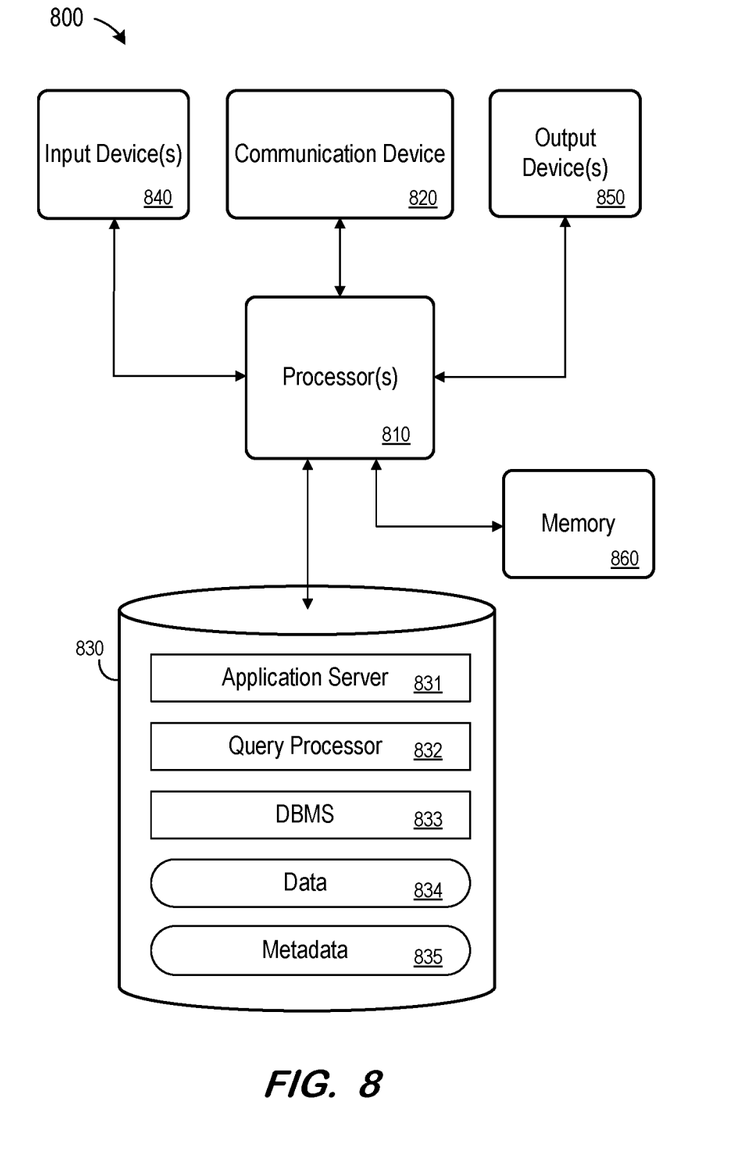
FIG. 8 is a block diagram of a database node according to some embodiments.

FIG. 8 is a block diagram of server node 800 according to some embodiments. Server node 800 may comprise a general-purpose computing apparatus and may execute program code to perform any of the functions described herein. Server node 800 may comprise an implementation of server node 100 in some embodiments. Server node 800 may include other unshown elements according to some embodiments.

Server node 800 includes processor(s) 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Application server 831 and query processor 832 may each comprise program code executed by processor(s) 810 to cause server 800 to perform any one or more of the processes described herein. Embodiments are not limited to execution of these processes by a single computing device.

Data 834 may include conventional partitioned database data as described above. As also described above, database data (either cached or a full database) may be stored in volatile memory such as volatile memory 860. Data storage device 830 may also store data and other program code for providing additional functionality and/or which are necessary for operation of server 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a first database server node to:
      receive a database query, the query comprising a first query statement to insert rows of a source table into a target table;
      generate a second query statement and a third query statement based on the first query statement, the second query statement to insert rows of a first partition of the source table into the target table and the third query statement to insert rows of a second partition of the source table into the target table;
      generate a first executable query operator based on the second query statement;
      generate a second executable query operator based the on third query statement;
      transmit the first executable query operator to a second database server node storing the first partition of the source table and a first partition of the target table, the second database server node to execute the first executable query operator to retrieve the rows of the first partition of the source table, to insert a subset of the rows of the first partition of the source table into the first partition of the target table and to insert another subset of the rows of the first partition of the source table into an other partition of the target table; and
      transmit the second executable query operator to a third database server node storing the second partition of the source table and a second partition of the target table, the third database server node to execute the second executable query operator to retrieve the rows of the second partition of the source table, to insert a subset of the rows of the second partition of the source table into the second partition of the target table and to insert another subset of the rows of the second partition of the source table into the other partition of the target table; and
   a fourth database server node storing the other partition of the target table.

2. A system according to claim 1, further comprising:
   the second database server node storing the first partition of the source table and a first partition of the target table, the second database server node to execute the first executable query operator to retrieve the rows of the first partition of the source table and to insert the rows of the first partition of the source table into the first partition of the target table; and
   the third database server node storing the second partition of the source table and a second partition of the target table, the third database server node to execute the second executable query operator to retrieve the rows of the second partition of the source table and to insert the rows of the second partition of the source table into the second partition of the target table.

3. A system according to claim 2, wherein a partitioning scheme of the source table is identical to a partitioning scheme of the target table.

4. A system according to claim 1, wherein a partitioning scheme of the source table is different from a partitioning scheme of the target table.

5. A system according to claim 1, the first database server node to:
   generate a fourth query statement based on the first query statement, the fourth query statement to insert rows of a third partition of the source table into the target table;
   generate a third executable query operator based the third query statement; and
   transmit the third executable query operator to the second database server node storing the third partition of the source table.

6. A computer-implemented method, comprising:
   receiving a first query statement to insert rows of a source table into a target table;
   generating a second query statement and a third query statement based on the first query statement, the second query statement to insert rows of a first partition of the source table into the target table and the third query statement to insert rows of a second partition of the source table into the target table;
   generating a first executable query operator based on the second query statement;
   generating a second executable query operator based on the third query statement;
   transmitting the first executable query operator to a second database server node storing the first partition of the source table and a first partition of the target table;
   instructing the second database server node to execute the second query statement to insert the rows of the first partition of the source table into the first partition of the target table;
   executing the first executable query operator at the second database server node to retrieve the rows of the first partition of the source table and to insert a subset of the rows of the first partition of the source table into the first partition of the target table and to insert another subset of the rows of the first partition of the source table into an other partition of the target table;

transmitting the second executable query operator to a third database server node storing the second partition of the source table and a second partition of the target table;

instructing the third database server node to execute the third query statement to insert the rows of the second partition of the source table into the second partition of the target table; and executing the second executable query operator at the third database server node to retrieve the rows of the second partition of the source table and to insert a subset of the rows of the second partition of the source table into the second partition of the target table and to insert another subset of the rows of the second partition of the source table into the other partition of the target table, wherein a fourth database server node stores the other partition of the target table.

7. A method according to claim 6, further comprising:

generating a first executable query operator based on the second query statement;

generating a second executable query operator based on the third query statement;

transmitting the first executable query operator to the second database server node;

transmitting the second executable query operator to the third database server node;

executing the first executable query operator at the second database server node to retrieve the rows of the first partition of the source table and to insert the rows of the first partition of the source table into the first partition of the target table; and executing the second executable query operator at the third database server node to retrieve the rows of the second partition of the source table and to insert the rows of the second partition of the source table into the second partition of the target table.

8. A method according to claim 7, wherein a partitioning scheme of the source table is identical to a partitioning scheme of the target table.

9. A method according to claim 6, wherein a partitioning scheme of the source table is different from a partitioning scheme of the target table.

10. A non-transitory computer-readable medium storing program code executable by a computing system to cause the computing system to:

receive a database query, the query comprising a first query statement to insert rows of a source table into a target table;

generate a second query statement and a third query statement based on the first query statement, the second query statement to insert rows of a first partition of the source table into the target table and the third query statement to insert rows of a second partition of the source table into the target table;

generate a first query operator executable to perform the second query statement;

generate a second query operator executable to perform the third query statement;

transmit the first executable query operator to a second database server node storing the first partition of the source table and a first partition of the target table;

execute the first executable query operator, at the second database server node, to retrieve the rows of the first partition of the source table, to insert a subset of the rows of the first partition of the source table into the first partition of the target table and to insert another subset of the rows of the first partition of the source table into an other partition of the target table;

transmit the second executable query operator to a third database server node storing the second partition of the source table and a second partition of the target table; and execute the second executable query operator, at a third database server node, to retrieve the rows of the second partition of the source table, to insert a subset of the rows of the second partition of the source table into the second partition of the target table and to insert another subset of the rows of the second partition of the source table into the other partition of the target table, wherein a fourth database server node stores the other partition of the target table.

11. A medium according to claim 10, the program code executable by a computing system to cause the computing system to:

execute the first executable query operator, at a second database server node storing the first partition of the source table and a first partition of the target table, to retrieve the rows of the first partition of the source table and to insert the rows of the first partition of the source table into the first partition of the target table; and executing the second executable query operator, at a third database server node storing the second partition of the source table and a second partition of the target table, to retrieve the rows of the second partition of the source table and to insert the rows of the second partition of the source table into the second partition of the target table.

12. A medium according to claim 11, wherein a partitioning scheme of the source table is identical to a partitioning scheme of the target table.

13. A medium according to claim 10, wherein a partitioning scheme of the source table is different from a partitioning scheme of the target table.

* * * * *